United States Patent [19]
Eslinger

[11] Patent Number: 6,120,107
[45] Date of Patent: Sep. 19, 2000

[54] COMPRESSOR AND AIR DRYER CONTROL SYSTEM

[75] Inventor: Ralph Gilbert Eslinger, Shelby Township, Mich.

[73] Assignee: Meritor Heavy Vehicle Systems, LLC, Troy, Mich.

[21] Appl. No.: 09/063,076

[22] Filed: Apr. 21, 1998

[51] Int. Cl.[7] .............................. B60T 17/00; B01D 53/26
[52] U.S. Cl. .................................... 303/1; 303/85; 96/114
[58] Field of Search ................................ 303/1, 6.01, 85; 96/109–116; 280/5.503, 5.514

[56] References Cited

U.S. PATENT DOCUMENTS

| | | |
|---|---|---|
| 4,459,085 | 7/1984 | Tonegawa . |
| 4,549,888 | 10/1985 | Fannin . |
| 4,714,483 | 12/1987 | Koening et al. . |
| 4,887,840 | 12/1989 | Harara et al. ........................ 280/5.503 |
| 4,900,098 | 2/1990 | Kuhn et al. ................................ 303/1 |
| 5,027,529 | 7/1991 | Cramer ..................................... 96/114 |
| 5,145,495 | 9/1992 | Elamin ..................................... 96/114 |
| 5,186,522 | 2/1993 | Spencer ..................................... 303/1 |
| 5,466,007 | 11/1995 | Smith ................................... 280/6.157 |
| 5,533,333 | 7/1996 | Pullar et al. .............................. 60/327 |
| 5,575,541 | 11/1996 | Elamin . |
| 5,592,754 | 1/1997 | Krieder et al. ............................ 96/114 |
| 5,678,900 | 10/1997 | Blanz ..................................... 303/6.01 |
| 5,855,379 | 1/1999 | Buma et al. ............................ 280/5.514 |
| 5,917,139 | 6/1999 | Goodell et al. ............................ 96/113 |

Primary Examiner—Chris Schwartz
Attorney, Agent, or Firm—Howard & Howard

[57] ABSTRACT

An air supply system for a vehicle includes an internal combustion engine that powers the vehicle and a compressor that receives air from the intake manifold of the engine or from an air filter. The compressor operates in either a loading or unloading mode and supplies air to the vehicle braking system. During the loading mode, air flows from the compressor through a dryer and is stored in a reservoir that supplies air to the brakes when the brakes are actuated. The dryer removes moisture and contaminants from the compressed air before the air is stored in the reservoir. A valve independently controls the compressor and dryer. A first sensor produces a fueling status signal in response to monitoring the fueling status of the engine and a second sensor produces a reservoir pressure signal in response to measuring the air pressure in the reservoir. An electronic control unit receives the reservoir and fueling status signals and produces a pressure comparison signal in response to comparing the reservoir pressure signal to a predetermined pressure signal. The electronic control unit controls the compressor based on the compressor and fueling status signals and controls the dryer based on the reservoir pressure signal.

27 Claims, 2 Drawing Sheets

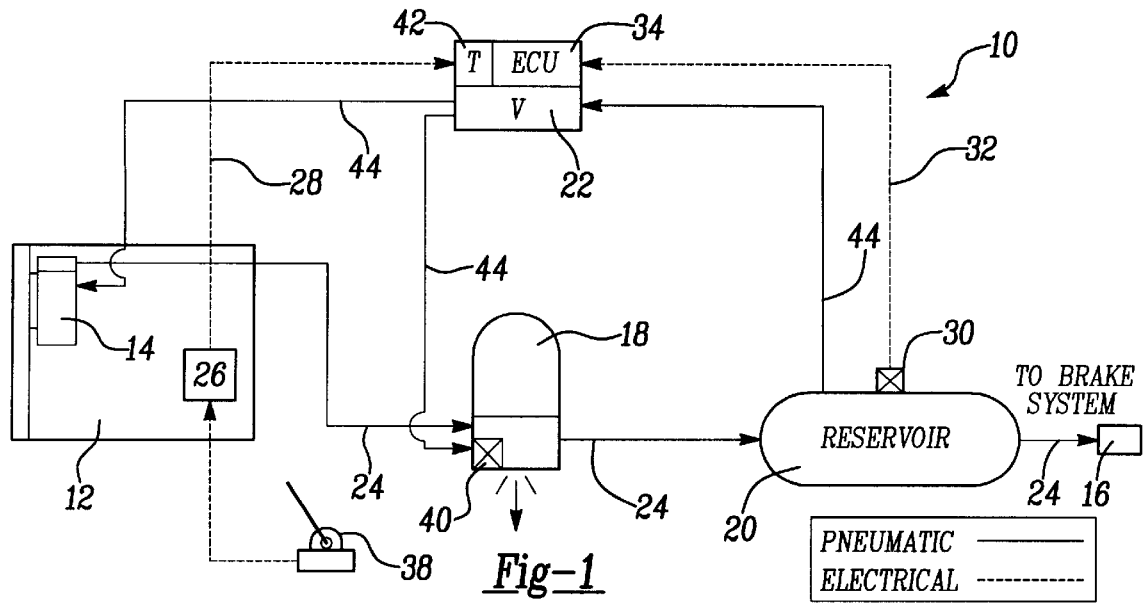
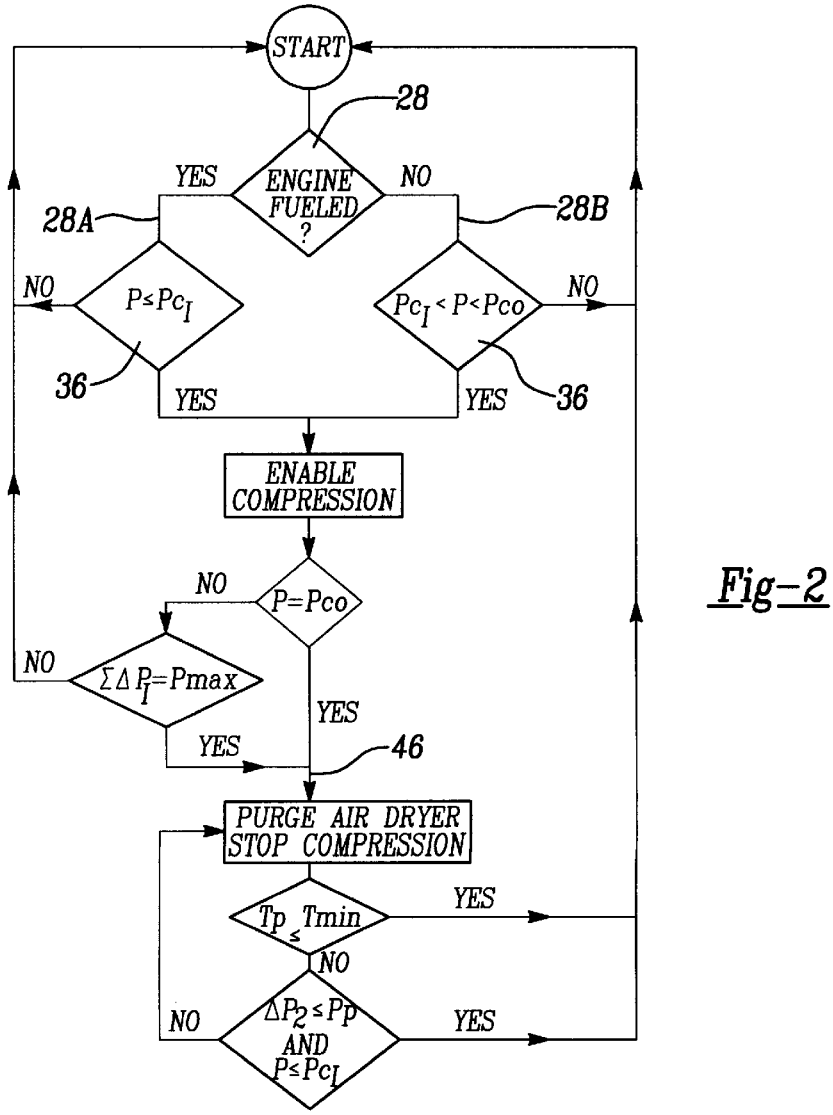

COMPRESSOR AND AIR DRYER CONTROL SYSTEM

BACKGROUND OF THE INVENTION

This invention relates to a unique system for controlling an air compressor and an air dryer as used in a vehicle's air brake system, which avoids unnecessary purging of the air dryer under certain pre-determined conditions.

One of the various braking systems used by heavy vehicles, is a compressed air brake system. This system typically includes an air compressor, which receives air from an engine intake manifold or air filter, an air dryer, a reservoir, and a governor that controls the operating mode of the air compressor. The air compressor operates in one of two modes, a loading or compressing mode and a unloading mode. When the pressure level in the reservoir falls below a specified minimum level, the governor causes the air compressor to operate in the compressing mode. When the air compressor is in the compressing mode it compresses air received from the engine intake manifold and sends it through a pneumatic line to the air dryer. The air dryer includes a filter that removes moisture and contaminants from the air, which is then sent to the reservoir. The air from the reservoir is used to supply air pressure to the vehicle's brakes.

Once the pressure level in the reservoir reaches a specified maximum pressure, the governor causes the air compressor to cut-out and operate in the unloading mode. In this mode, air is no longer supplied to the brake system. Also during this mode, air is purged from the air dryer causing moisture to be removed from the filter and discharged to the atmosphere. This purging will continue until a pre-set pressure level in the reservoir is reached or a fixed volume of air is exhausted, dependant on the type of air dryer.

Prior art systems control both the compressor and air dyer purge valve with the same pneumatic signal. Hence, each time the compressor unloads, the air dryer is purged. It would be advantageous to have separate controls for the compressor and the dryer such that when the engine is not being fueled, i.e. the driver is not pressing down on an accelerator pedal, the compressor would provide compressed air to the reservoir when the reservoir pressure is above cut-in but below cut-out pressure, without adding to parasitic engine power loss. To accomplish this it is necessary to control the air dryer purge independently from the compressor by solely monitoring the reservoir pressure.

Thus, it is desirable to have an air braking control system that continuously monitors the fueling status of the engine and the air pressure in the reservoir so that unnecessary purging of the air dryer is avoided under certain pre-determined conditions.

SUMMARY OF THE INVENTION

The subject invention overcomes the deficiencies of prior art control system methods by controlling a compressor and an air dryer in an air supply system based on monitoring the fueling status of a vehicle engine and the pressure in a brake system reservoir. An electronic control unit and valve module independently controls the compressing and purging modes of the compressor and dryer, respectively, so that unnecessary purging of the reservoir is avoided.

The invention includes a method for controlling an air supply system for a vehicle that includes an engine for powering the vehicle and a compressor for supplying air to a reservoir. The reservoir stores air for a braking system wherein the air is passed through a dryer before entering the reservoir. A fueling status signal is produced in response to monitoring the fueling status of the engine. A reservoir pressure signal is produced in response to measuring the air pressure in the reservoir and a pressure comparison signal is produced in response to comparing the reservoir pressure signal to a pre-determined pressure signal. The compressor is controlled based on the pressure comparison and fueling status signals, and the dryer is controlled based on the reservoir pressure signal.

The air supply system includes an engine that powers the vehicle and a compressor. The compressor operates in either a compressing/loading mode or an unloading mode and supplies air to the vehicle braking system. During the compressing mode, air flows from the compressor through a dryer and is stored in a reservoir that supplies air to the brakes when the brakes are actuated. The dryer is pneumatically connected to the compressor and the reservoir. A first sensor produces a fueling status signal in response to monitoring the fueling status of the engine and a second sensor produces a reservoir pressure signal in response to measuring the air pressure in the reservoir. An electronic control unit receives the reservoir and fueling status signals and produces a pressure comparison signal in response to comparing the reservoir pressure signal to a pre-determined pressure signal. The electronic control unit controls the compressor based on the pressure comparison and fueling status signals and controls the dryer based on the reservoir pressure signal. A valve controls the compressor loading and unloading modes and controls purging of the dryer.

The subject invention offers several advantages over prior art systems because it provides a simple, effective, and efficient method and apparatus for controlling the compressor and dyer in an air supply system based on monitoring the fueling status of the engine and the reservoir pressure so that unnecessary purging of the dryer is avoided.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a schematic view of the inventive system;

FIG. 2 is a flow chart describing the inventive method;

DETAILED DESCRIPTION OF A PREFERRED EMBODIMENT

Figure 3:
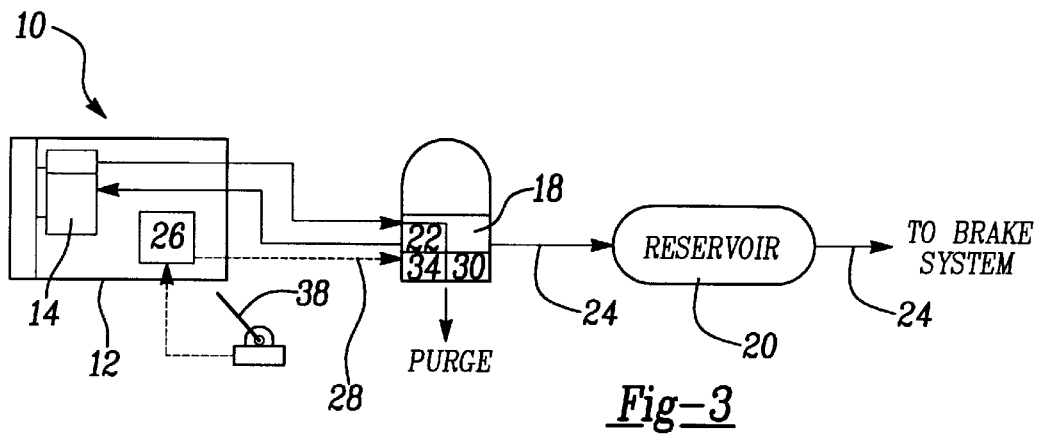
FIG. 3 is a schematic view of an alternate embodiment of the inventive system.

An air supply system for a vehicle is generally shown at 10 in FIG. 1. The air supply system 10 includes an engine 12 that powers the vehicle and a compressor 14. The compressor 14 operates in either a compressing (loading) mode or an unloading mode and supplies air to a vehicle braking system 16. Typically, the engine is an internal combustion engine that supplies air to the compressor 14 through an intake manifold or air filter (not shown) as is well known in the art. While the compressor 14 supplies air to the braking system 16, it can also be used to supply air to other accessory devices such as a vehicle air suspension or air assisted seats.

During the compressing mode, air flows from the compressor 14 through a dryer 18 and is stored in a reservoir 20 that supplies air to the brake system 16 when the brakes are actuated. The dryer 18 removes moisture and contaminants from the compressed air before the air is stored in the reservoir 20 as is well known in the art. The dryer 18 can also operate in a purging mode where air in the dryer is purged to the atmosphere so that moisture is removed from the dryer's filter. A valve 22 controls the compressor loading and unloading modes and the air dryer purge.

Various pneumatic connections 24 exist between the compressor 14, dryer 18, reservoir 20, and brake system 16. Air transfer pneumatic connections 24 exist between the compressor 14 and dryer 18, between the dryer 18 and reservoir 20, and between the reservoir 20 and the brakes 16. Pneumatic signals 44 exist between the valve 22 and compressor 14, between the valve 22 and dryer 18, and between the valve 22 and the reservoir 20. These pneumatic signals 44 operate in conjunction with valve 22 to control the loading and unloading modes of the compressor 14 and the purging of the dryer 18.

A first sensor 26 is located near the engine 12 and produces a fueling status signal 28 in response to monitoring the fueling status of the engine 12. The first sensor can be any of various sensors known in the art, such as a potentiometer associated with an accelerator pedal 38, for example. The potentiometer produces the fueling status signal 28 by monitoring driver input to the accelerator pedal 38. It should be noted that the fueling status signal 28 shown in FIG. 1 is a dashed line representing an electrical signal. Similarly, other electrical signals are also shown as dashed lines in FIG. 1.

A second sensor 30 is located near the reservoir 20 produces a reservoir pressure signal 32 in response to measuring the air pressure in the reservoir 20. Typically, the second sensor 30 is a pressure sensor that is supported on the reservoir 20 or integrated in valve 22. An electronic control unit (ECU) 34 receives the reservoir pressure 32 and fueling status 28 signals and produces a pressure comparison signal 36 in response to comparing the reservoir pressure signal 32 to a pre-determined pressure signal. The pre-determined pressure signal is pre-programmed into the ECU 34 and will be discussed in more detail below. The ECU 34 controls the compressor 14 based on the pressure comparison 36 and fueling status 28 signals while it controls the dryer 18 based on the reservoir pressure signal 32. It should be understood that the first 26 and second 30 sensors could be incorporated into the ECU 34 or valve 22 and that it is possible to have more than one ECU 34 in the air supply system 10. Also, the valve 22 can be a separate module including solenoid valves (not shown) or the valve 22 can be incorporated directly into the ECU 34.

The dryer 18 can operate in a loading mode or a purging mode. When the dryer 18 is operating in the loading mode, it receives compressed air from the compressor 14, it removes moisture and contaminants from the air, and it sends the air to the reservoir 20. When the dryer is operating in the purging mode, air is purged from the dryer 18 through a purge valve 40 that releases air to the atmosphere. The purge valve opens and the dryer operates in the purging mode when the ECU 34 sends the appropriate signal, discussed in detail below.

The ECU 34 includes a timing device 42 for producing a timing signal $T_P$ in response to timing the duration of the purging cycle of the dryer 18. The ECU 34 compares the timing signal $T_P$ to a minimum purge time and discontinues the purging mode of the dryer 18 by signaling the purge valve 40 to close if the timing signal $T_P$ is greater than or equal to the minimum purge time. The method for controlling the air supply system 10 is shown in the flowchart in FIG. 2. The fueling status signal 28 is produced in response to monitoring the fueling status of the engine. The reservoir pressure signal 32 is produced in response to measuring the air pressure in the reservoir 20. Note that the reservoir pressure signal 32 shown in FIG. 1 is designated P in the flowchart in FIG. 2. The pressure comparison signal 36 is produced in response to comparing the reservoir pressure signal 32 to a pre-determined pressure signal.

The fueling status signal 28 is electronically determined by monitoring the driver's input to the engine 12. A first fueling signal 28A is produced when the engine is being fueled, and a second fueling signal 28B is produced when the engine is not being fueled. It should be understood that the first 28A and second 28B fueling signals are incorporated into the main fueling status signal 28 and are representative in nature as fueling and non-fueling signals, respectively. The engine is considered fueled when the driver presses the accelerator pedal 38 to drive the vehicle. The engine is considered to not be fueled when the driver releases the accelerator pedal 38 to brake the vehicle or when the vehicle is idling in park, for example. The ECU 34 receives the fueling signals 28A, 28B and the reservoir pressure signal 32 and determines whether or not the compressor 14 should be signaled to operate in the compressing mode. to As previously discussed above, the compressor 14 sends air through a dryer 18 and then to a reservoir 20 where the air is stored until it is supplied to the brake system 16. The pressure in the reservoir 20 must be maintained between a minimum allowable pressure and a maximum allowable pressure. Typically these pressures are referred to as the cut-in pressure $P_{CI}$ and the cut-out pressure $P_{CO}$, respectively. Thus, if the pressure in the reservoir 20 falls below the cut-in pressure $P_{CI}$, the compressor 14 is signaled by the ECU 34 to operate in the compressing mode independent of the fueling status 28 and if the pressure in the reservoir 20 exceeds the cut-out pressure $P_{CO}$ the compressor 14 is signaled to stop compressing. A typical cut-in pressure $P_{CI}$, is one hundred (100) psi and a typical cut-out pressure $P_{CO}$ is one hundred and twenty-five (125) psi plus or minus five (5) psi. It should be understood that other values can be used for the cut-in $P_{CI}$ and cut-out $P_{CO}$ pressures.

The pre-determined pressure signal that is compared to the reservoir pressure signal 32 refers generally to the cut-in $P_{CI}$ and cut-out $P_{CO}$ pressures. When the reservoir pressure is between the cut-in $P_{CI}$ and cut-out $P_{CO}$ pressures, the control of the compressor 14 depends on whether the engine is being fueled or not. When the engine 12 is not being fueled (the second fueling signal 28B is produced) the reservoir pressure signal 32 is compared to the cut-out pressure signal $P_{CO}$ and if the reservoir pressure falls between the cut-in $P_{CI}$ and cut-out $P_{CO}$ pressures the ECU 34 will signal the compressor 14 to load. When the first fueling signal 28A is produced, i.e. the engine is being fueled, the compressor 14 is signaled to load if the reservoir pressure is less than the cut-in pressure signal $P_{CI}$.

Once the compressor 12 is in the compressing mode it will compress air and send it to the dryer 18 until it is signaled to stop compressing. Additionally, the dryer 18 will operate in the loading mode, i.e. it will remove moisture and contaminants from the compressed air and send it to the reservoir 20, until it is signaled by the ECU 34 to operate in the purging cycle.

When using the inventive method, as long as fueling is occurring and the reservoir pressure signal 32 is greater than the cut-in pressure $P_{CI}$ and less than the cut-out pressure $P_{CO}$ the compressor 14 is not compressing. A purging signal 46 is produced in response to comparing the reservoir pressure signal 32 to the cut-out pressure signal $P_{CO}$. The purging signal 46 enables the dryer 18 to operate in the purging mode under one of two conditions. The first condition requires the dryer 18 to be purged when the reservoir pressure signal 32 is equal to the cut-out pressure signal $P_{CO}$. If the reservoir pressure signal 32 is different than the cut-out pressure $P_{CO}$, the dryer 18 is not signaled to purge and the second condition is applied. The second condition requires the dryer 18 to be purged based on monitoring the amount that the pressure in the reservoir 20 has increased while the compressor 14 has been operating in the compressing mode.

Under the second condition, a first delta signal $\Delta P_1$ is produced in response to measuring the increase in pressure in the reservoir 20 due to the compressor 14 operating in the compressing mode. The first delta signal $\Delta P_1$ is compared to a pressure differential signal $\Delta P_{MAX}$, which is equal to the absolute difference between the cut-in $P_{CI}$ and cut-out $P_{CO}$ pressure signals. The ECU 34 signals the dryer 18 to purge when the first delta signal $\Delta P_1$ is equal to the pressure differential signal $\Delta P_{MAX}$.

Incremental pressure increases in the reservoir 20 as the driver starts and stops the vehicle. For example, when the driver is approaching a red stoplight his foot is removed from the accelerator pedal 38 and if the reservoir pressure signal 32 is less than the cut-out pressure $P_{CO}$, the compressor 13 will operate in the compressing mode. This will cause the pressure to begin to increase in the reservoir 20. If the stoplight then turns green, the driver will accelerate and the compressor will stop operating in the compressing mode unless the reservoir pressure signal 32 is less than the cut-in pressure $P_{CI}$. As the vehicle experiences this alternating fueled/non-fueled operation, the pressure in the reservoir will increase slightly between each fueled and non-fueled cycle. The incremental pressure increase for each cycle can vary based on the length of time the vehicle is not being fueled.

The first delta signal $\Delta P_1$ is based on a summation of all of these positive incremental pressure increases. The first delta signal $\Delta P_1$ is then compared to the pressure differential signal $\Delta P_{MAX}$ which represents the difference between the cut-in $P_{CI}$, and cut-out $P_{CO}$ pressures, typically twenty-five (25) psi. If the sum of these incremental pressure values is equal to the pressure differential signal $\Delta P_{MAX}$, then the dryer 18 is signaled to operate in the purging mode.

Once the dryer 18 is operating in the purging mode, the compressor 14 is signaled to stop operating in the compressing mode. The timing signal, referred to as $T_P$ in FIG. 2, is produced in response to timing the duration of the purging cycle of the dryer 18. The timing signal $T_P$ is then compared to a minimum purge time $T_{MIN}$. The ECU 34 signals the valve 22 to discontinue the purging mode if the timing signal $T_P$ is greater than or equal to the minimum purge time $T_{MIN}$. A typical value for the minimum purge time $T_{MIN}$ is thirty (30) seconds, but times can vary depending on the dryer 18.

Alternatively, the ECU 34 signals the dryer 18 to discontinue the purging mode based on monitoring the amount that the pressure in the reservoir 20 has dropped while the dryer 18 has been operating in the purging mode. A second delta signal $\Delta P_2$ is produced in response to measuring the pressure drop in the reservoir 20 as the dryer 18 operates in the purging mode. The second delta signal $\Delta P_2$ is compared to a maximum allowable purge pressure drop $P_P$. The purging mode of the dryer 18 is continued if the second delta signal $\Delta P_2$ is less than the maximum allowable purge pressure drop $P_P$ and if the reservoir pressure signal 32 is greater than the cut-in pressure signal $P_{CI}$. A typical value for the maximum allowable purge pressure drop $P_P$ is ten (10) psi but the maximum allowable purge pressure drop $P_P$ can be varied.

FIG. 3 shows an alternate embodiment of the subjection invention. The ECU 34, valve 22, and reservoir pressure sensor 30 are integral with the dryer 18. Pneumatic connections exist between the compressor 14 and the dryer 18, between the dryer 18 and the reservoir 20, and between the reservoir 20 and the brake system 16. Electrical connections exist between the accelerator pedal 38 and the sensor 26 and between the sensor 26 and dryer.

Figure 4:
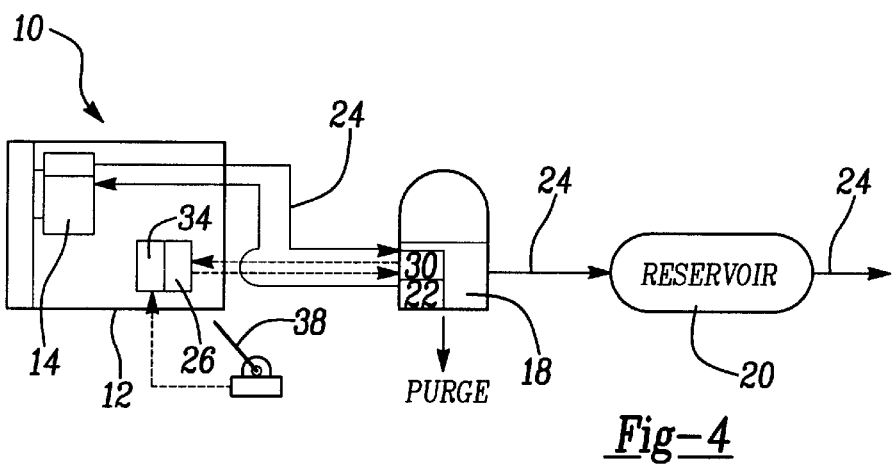
FIG. 4 is a schematic view of a second alternate embodiment of the inventive system.

FIG. 4 shows a second alternate embodiment of the inventive system 10. The system 10 uses the engine ECU 34 to control the system functions and incorporates the reservoir pressure sensor 30 and the valve 22 into the dryer. As with the other embodiments, pneumatic connections exist between the compressor 14 and the dryer 18, between the dryer 18 and the reservoir 20, and between the reservoir 20 and the brake system 16.

Figure 5:
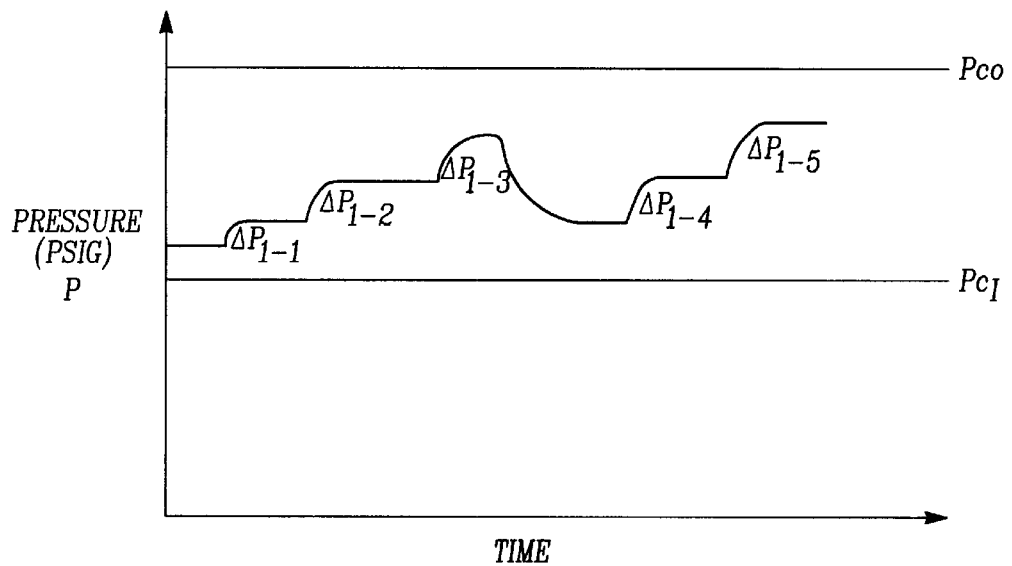
FIG. 5 is a pressure versus time graph representing the summation of incremental pressure increases.

FIG. 5 is a pressure versus time graph representing the first delta signal $\Delta P_1$ that is produced in response to measuring the increase in pressure in the reservoir 20 due to the compressor 14 operating in the compressing mode. The first delta signal $\Delta P_1$ represents a summation of the positive incremental pressure increases experienced in the reservoir 20, as determined from the following formula, $\Delta P_1 = \Sigma \Delta P_i$, where "i" is an integer representing each time the reservoir 20 experiences a positive pressure increase. Each positive pressure increase $\Delta P_{1-1}$, through $\Delta P_{1-5}$, as shown in FIG. 5, is added together and compared to the pressure differential signal $\Delta P_{MAX}$, which is equal to the absolute difference between the cut-in $P_{CI}$ and cut-out $P_{CO}$ pressure signals. The ECU 34 signals the dryer 18 to purge when the first delta signal $\Delta P_1$ is equal to the pressure differential signal $\Delta P_{MAX}$. The number of pressure increases will vary depending upon how many fueling and non-fueling operations are experience by the vehicle.

Thus, the subject air supply system 10 offers the advantage of having independent controls for the compressor 14 and the dryer 18 such that unnecessary purging of the dryer 18 is avoided. Because the compressor is controlled based on input from the fueling status signal 28, the dryer 18 is not necessarily purging if the compressor 14 is not operating in the compressing mode.

A preferred embodiment of this invention has been disclosed, however, a worker of ordinary skill in the art would recognize that certain modifications come within the scope of this invention. For that reason, the following claims should be studied to determine the true scope and content of this invention.

I claim:

1. A method for controlling an air supply system for a vehicle comprising the steps of:
   1) providing an engine for powering the vehicle and a compressor for supplying air to a reservoir that stores air for a braking system wherein the air is passed through a dryer before entering the reservoir;
   2) producing a fueling status signal in response to monitoring the fueling status of the engine;
   3) producing a reservoir pressure signal in response to measuring the air pressure in the reservoir;
   4) producing a pressure comparison signal in response to comparing the reservoir pressure signal to a predetermined pressure signal;

5) controlling the compressor based on the pressure comparison signal and the fueling status signal; and 6) controlling the dryer based on the reservoir pressure signal.

2. A method as set forth in claim 1 wherein producing the fueling status signal further includes the steps of electronically determining the fueling status based on driver input to the engine, producing a first fueling signal when the engine is being fueled, and producing a second fueling signal when the engine is not being fueled.

3. A method as set forth in claim 2 wherein producing the pressure comparison signal further includes the step of comparing the reservoir pressure signal to the pre-determined pressure signal when the first fueling signal is produced wherein the pre-determined pressure signal is further defined as a pre-determined cut-in pressure signal.

4. A method as set forth in claim 3 further including the step of enabling the compressor to operate in a compressing mode when the reservoir pressure signal is less than or equal to the cut-in pressure signal.

5. A method as set forth in claim 4 further including the step of producing a purging signal in response to comparing the reservoir pressure signal to a pre-determined cut-out pressure signal.

6. A method as set forth in claim 5 wherein producing the purging signal further includes the steps of producing a first delta signal in response to measuring the increase in pressure in the reservoir due to the compressor operating in the compressing mode if the reservoir pressure signal is different than the cut-out pressure signal, comparing the first delta signal to a pressure differential signal equal to the absolute difference between the cut-in and cut-out pressure signals, and purging the dryer when the first delta signal is equal to the pressure differential signal.

7. A method as set forth in claim 5 wherein producing the purging signal further includes the step of purging the dryer when the reservoir pressure signal is equal to the cut-out pressure signal.

8. A method as set forth in claim 5 further including the steps of enabling the dryer to operate in a purging mode and discontinuing the compressing mode of the compressor based on input from the purging signal.

9. A method as set forth in claim 8 further including the steps of producing a timing signal in response to timing the duration of the purging of the dryer, comparing the timing signal to a minimum purge time, and discontinuing the purging mode of the dryer if the timing signal is greater than or equal to the minimum purge time.

10. A method as set forth in claim 8 further including the steps of producing a second delta signal in response to measuring the pressure drop in the reservoir as the dryer operates in the purging mode, comparing the second delta signal to a maximum allowable purge pressure drop, and discontinuing the purging mode of the dryer if the second delta signal is greater than or equal to the maximum allowable purge pressure drop and if the reservoir pressure signal is less than or equal to the cut-in pressure signal.

11. A method as set forth in claim 2 wherein producing the pressure comparison signal further includes the step of comparing the reservoir pressure signal to the pre-determined pressure signal when the second fueling signal is produced wherein the pre-determined pressure signal is further defined as a pre-determined cut-out pressure signal.

12. A method as set forth in claim 11 further including the step of enabling the compressor to operate in a compressing mode when the reservoir pressure signal is less than the cut-out pressure signal.

13. A method as set forth in claim 12 further including the step of producing a purging signal in response to comparing the reservoir pressure signal to the cut-out pressure signal.

14. A method as set forth in claim 13 wherein producing the purging signal further includes the steps of producing a first delta signal in response to measuring the increase in pressure in the reservoir due to the compressor operating in the compressing mode if the reservoir pressure signal is different than the cut-out pressure signal, comparing the first delta signal to a pressure differential signal equal to the absolute difference between the cut-in and cut-out pressure signals, and purging the dryer when the first delta signal is equal to the pressure differential signal.

15. A method as set forth in claim 13 wherein producing the purging signal further includes the step of purging the dryer when the reservoir pressure signal is equal to the cut-out pressure signal.

16. A method as set forth in claim 13 further including the steps of enabling the dryer to operate in a purging mode and discontinuing the compressing mode of the compressor based on input from the purging signal.

17. A method as set forth in claim 16 further including the steps of producing a timing signal in response to timing the duration of the purging, comparing the timing signal to a minimum purge time, and discontinuing the purging mode of the dryer if the timing signal is greater than or equal to the minimum purge time.

18. A method as set forth in claim 17 further including the steps of producing a second delta signal in response to measuring the pressure drop in the reservoir as the dryer operates in the purging mode, comparing the second delta signal to a maximum allowable purge pressure drop, and discontinuing the purging mode of the dryer if the second delta signal is greater than or equal to the maximum allowable purge pressure drop and if the reservoir pressure signal is less than or equal to the cut-in pressure signal.

19. An air supply system for a vehicle comprising:

an engine for powering the vehicle;

a first sensor for producing a fueling status signal in response to monitoring the fueling status of said engine;

a compressor for operating in a compressing mode or an unloading mode;

a dryer pneumatically connected to said compressor;

a reservoir for supplying air to a braking system, said reservoir being pneumatically connected to said dryer;

a second sensor for producing a reservoir pressure signal in response to measuring the air pressure in said reservoir; and an electronic control unit for producing a pressure comparison signal in response to comparing said reservoir pressure signal to a pre-determined pressure signal, wherein said electronic control unit controls said compressor based on said pressure comparison and fueling status signals and controls said dryer based on said reservoir pressure signal.

20. An air supply system as set forth in claim 19 wherein said first sensor is associated with an accelerator pedal wherein said sensor communicates the fueling status of said engine to said electronic control unit based on driver input to said accelerator pedal.

21. An air supply system as set forth in claim 19 wherein said second sensor is a pressure sensor supported by said reservoir.

22. An air supply system as set forth in claim 19 wherein said dryer operates in a loading or purging mode and includes a purge valve for releasing air to the atmosphere, said dryer operating in said purging mode when said reservoir pressure signal is equal to a pre-determined cut-out pressure.

23. An air supply system as set forth in claim 22 wherein said electronic control unit produces a first delta signal in response to measuring the increase in pressure in said reservoir due to said compressor operating in the compressing mode if said reservoir pressure signal is different than said cut-out pressure, compares said first delta signal to a pressure differential signal equal to the absolute difference between a pre-determined cut-in pressure and said pre-determined cut-out pressure, and signals said purge valve to open such that said dryer operates in the purging mode when the first delta signal is equal to the pressure differential signal.

24. An air supply system as set forth in claim 23 including a timing device for producing a timing signal in response to timing the duration of the purging wherein said electronic control unit compares said timing signal to a minimum purge time, and discontinues the purging mode of the dryer if said timing signal is greater than or equal to said minimum purge time.

25. An air supply system as set forth in claim 24 wherein said timing device is integral with said electronic control unit.

26. An air supply system as set forth in claim 24 wherein said electronic control unit produces a second delta signal in response to measuring the pressure drop in said reservoir as said dryer operates in said purging mode, compares said second delta signal to a maximum allowable purge pressure drop, and signals said purge valve to open such that said dryer operates in the purging mode if said second delta signal is less than said maximum allowable purge pressure drop and if said reservoir pressure signal is greater than said cut-in pressure.

27. An air supply system as set forth in claim 19 wherein said second sensor is a pressure sensor integrated into said electronic control unit.

* * * * *